United States Patent
Burka et al.

(10) Patent No.: US 8,805,885 B2
(45) Date of Patent: Aug. 12, 2014

(54) METHOD, SYSTEM AND PROGRAM PRODUCT FOR INTERNING INVARIANT DATA OBJECTS IN DYNAMIC SPACE CONSTRAINED SYSTEMS

(75) Inventors: Peter W. Burka, Ottawa (CA); Barry M. Genova, Carp (CA)

(73) Assignee: International Business Machines Corporation, Armonk, NY (US)

( * ) Notice: Subject to any disclaimer, the term of this patent is extended or adjusted under 35 U.S.C. 154(b) by 1962 days.

(21) Appl. No.: 11/928,571

(22) Filed: Oct. 30, 2007

(65) Prior Publication Data

US 2008/0065689 A1   Mar. 13, 2008

Related U.S. Application Data

(63) Continuation of application No. 11/039,211, filed on Jan. 19, 2005, now Pat. No. 7,315,871.

(51) Int. Cl.
*G06F 17/00* (2006.01)
*G06F 17/30* (2006.01)

(52) U.S. Cl.
CPC ..................................... *G06F 17/00* (2013.01)
USPC ............ 707/791; 707/802; 711/134; 711/147

(58) Field of Classification Search
CPC ..... G06F 17/246; G06F 19/16; G06F 19/706;
G06F 19/708; G06F 3/023; G06F 9/4435;
G06F 11/3612; G06F 8/443; G06F 8/447;
G06F 9/44521; G06F 9/45516; G06F 11/0718;
G06F 11/073; G06F 11/0751; G06F 12/0253;
G06F 9/485
USPC ........................... 707/791, 802; 711/134, 147
See application file for complete search history.

(56) References Cited

U.S. PATENT DOCUMENTS

| | | | |
|---|---|---|---|
| 5,694,591 A | 12/1997 | Du et al. | |
| 5,710,908 A | 1/1998 | Man | |
| 6,741,983 B1 | 5/2004 | Birdwell et al. | |
| 6,799,173 B2 * | 9/2004 | Czajkowski et al. | 711/147 |
| 7,051,161 B2 * | 5/2006 | Dixit et al. | 711/134 |
| 7,631,024 B2 * | 12/2009 | Wright et al. | 1/1 |
| 2001/0051956 A1 | 12/2001 | Bird | |
| 2004/0006451 A1 | 1/2004 | Bharadwaj et al. | |

\* cited by examiner

*Primary Examiner* — Yicun Wu
(74) *Attorney, Agent, or Firm* — Winstead, P.C.

(57) ABSTRACT

Under the present invention, a hierarchical tree and corresponding Least Recently Used (LRU) list are provided. Both include a predetermined quantity of nodes that are associated with invariant data objects. The nodes of the tree typically include a set of pointers that indicate a position/arrangement of the associated invariant data objects in the LRU list, and a set of pointers that indicate a logical relationship among the other nodes.

20 Claims, 6 Drawing Sheets

METHOD, SYSTEM AND PROGRAM PRODUCT FOR INTERNING INVARIANT DATA OBJECTS IN DYNAMIC SPACE CONSTRAINED SYSTEMS

REFERENCE TO PRIOR APPLICATIONS

This application is a continuation application of U.S. patent application Ser. No. 11/039,211, filed on Jan. 19, 2005, now U.S. Pat. No. 7,315,871 which is hereby incorporated by reference.

BACKGROUND OF THE INVENTION

1. Field of the Invention

In general, the present invention provides a method, system and program product for interning invariant data objects in dynamic space constrained systems. Specifically, the present invention provides a system for efficiently tracking and reusing invariant data objects at runtime.

2. Related Art

In programs, invariant data typically consumes a significant amount of memory. Invariant data is data that is known to never change. Examples of invariant data objects include method names, data strings within methods, etc. When a program component (e.g., class file) is loaded, all of its members must be copied into runtime structures. Some of these members are variant (e.g. class field slots), and others are invariant (e.g. method names).

To reduce the amount of memory space required, modern compilers remove duplicate invariant data objects. Dynamic systems, where the components of a program are gathered together at runtime, present certain difficulties. Specifically, when done at compile time, there are few time or memory constraints. However, at runtime, both time and space must be conserved since excessive use of either may have a negative impact on the program being executed. An additional complication for dynamic systems is that they may not rely on whole-program analysis. Instead, the system must dynamically adjust its invariant interning mechanisms. An additional complication posed by dynamic systems is the issue of component unloading. Specifically, in a dynamic system, certain components may be removed from the system (e.g., Class unloading in Java). To this extent, the interning mechanism should ensure that no unloaded invariant is required by the components that are still loaded.

Unfortunately, no existing system provides an efficient way to intern invariant data objects while ensuring that the memory space and time consumed by the interning mechanism does not exceed any savings generated thereby. In view of the foregoing, there exists a need for a method, system and program product for interning invariant data objects in dynamic space constrained systems. Specifically, a need exists for an interning mechanism that can track and reuse invariant data objects. A further need exists for such a system to impose restrictions on the amount of memory space used, and the amount of time incurred by interning invariant data at runtime.

SUMMARY OF THE INVENTION

In general, the present invention provides a method, system and program product for interning invariant data objects in dynamic space constrained systems. Specifically, under the present invention, a Least Recently Used (LRU) list and corresponding hierarchical tree are provided. The LRU list and tree each include a predetermined quantity of nodes that are associated with invariant data objects. The nodes typically include one set of pointers that indicate a position/arrangement of the associated invariant data objects in the LRU list, and another set of pointers that indicate a logical relationship among the other nodes of the hierarchical tree. When an invariant data object is loaded at runtime, the tree is checked to see if an identical invariant data object is present. If it is, the node in the LRU list associated with the invariant data object is moved to the head of the LRU list. However, if the invariant data object is not present in the tree, a new node associated therewith is added to the LRU list and the tree. This new node is typically placed at the head of the LRU list. As nodes of the LRU list are repositioned or added, the pointers of the corresponding nodes of the hierarchical tree will be rearranged accordingly.

A first aspect of the present invention provides a method for interning invariant data objects in dynamic space constrained systems, comprising: providing a list of least recently used invariant data objects, wherein the list includes a predetermined quantity of nodes that are associated with invariant data objects, wherein the nodes are positioned in the list based on a recentness of use of their associated invariant data objects, and wherein each of the nodes includes a first set of pointers that point to other nodes based on the positioning of the nodes in the list; providing a hierarchical tree corresponding to the list, wherein hierarchical tree includes all of the nodes in the list; reading an invariant data object; placing a node associated with the invariant data object at a head of the list; and
rearranging the first set of pointers of the nodes of the hierarchical tree based on the placing.

A second aspect of the present invention provides a system for interning invariant data objects in dynamic space constrained systems, comprising: a list system for providing a list of least recently used invariant data objects, wherein the list includes a predetermined quantity of nodes that are associated with invariant data objects, wherein the nodes are positioned in the list based on a recentness of use of their associated invariant data objects, and wherein each of the nodes includes a first set of pointers that point to other nodes based on the positioning of the nodes in the list; a tree system for providing a hierarchical tree corresponding to the list, wherein hierarchical tree includes all of nodes in the list; and a data object reading system for reading an invariant data object, wherein a node associated with the invariant data object is placed at a head of the list, and wherein the first set of pointers of the nodes of the hierarchical tree are rearranged based on the placing.

A third aspect of the present invention provides a program product stored on a recordable medium for interning invariant data objects in dynamic space constrained systems, which when executed, comprises: program code for providing a list of least recently used invariant data objects, wherein the list includes a predetermined quantity of nodes that are associated with invariant data objects, wherein the nodes are positioned in the list based on a recentness of use of their associated invariant data objects, and wherein each of the nodes includes a first set of pointers that point to other nodes based on the positioning of the nodes in the list; program code for providing a hierarchical tree corresponding to the list, wherein hierarchical tree includes all of the nodes in the list; and program code for reading an invariant data object, wherein a node associated with the invariant data object is placed at a head of the list, and wherein the first set of pointers of the nodes of the hierarchical tree are repositioned based on the placing.

A fourth aspect of the present invention provides a method for deploying an application for interning invariant data objects in dynamic space constrained systems, comprising: providing a computer infrastructure being operable to: provide a list of least recently used invariant data objects, wherein the list includes a predetermined quantity of nodes that are associated with invariant data objects, wherein the nodes are positioned in the list based on a recentness of use of their associated invariant data objects, and wherein each of the nodes includes a first set of pointers that point to other nodes based on the positioning of the nodes in the list; provide a hierarchical tree corresponding to the list, wherein hierarchical tree includes all of the nodes in the list; read an invariant data object; place a node associated with the invariant data object at a head of the list; and rearrange the first set of pointers of the nodes of the hierarchical tree based on the placing.

A fifth aspect of the present invention provides computer software embodied in a propagated signal for interning invariant data objects in dynamic space constrained systems, the computer software comprising instructions to cause a computer system to perform the following functions: provide a list of least recently used invariant data objects, wherein the list includes a predetermined quantity of nodes that are associated with invariant data objects, wherein the nodes are positioned in the list based on a recentness of use of their associated invariant data objects, and wherein each of the nodes includes a first set of pointers that point to other nodes based on the positioning of the nodes in the list; provide a hierarchical tree corresponding to the list, wherein hierarchical tree includes all of the nodes in the list; read an invariant data object; place a node associated with the invariant data object at a head of the list; and rearrange the first set of pointers of the nodes of the hierarchical tree based on the placing.

Therefore, the present invention provides a method, system and program product for interning invariant data objects in dynamic space constrained systems.

BRIEF DESCRIPTION OF THE DRAWINGS

These and other features of this invention will be more readily understood from the following detailed description of the various aspects of the invention taken in conjunction with the accompanying drawings in which.

Figure 1:
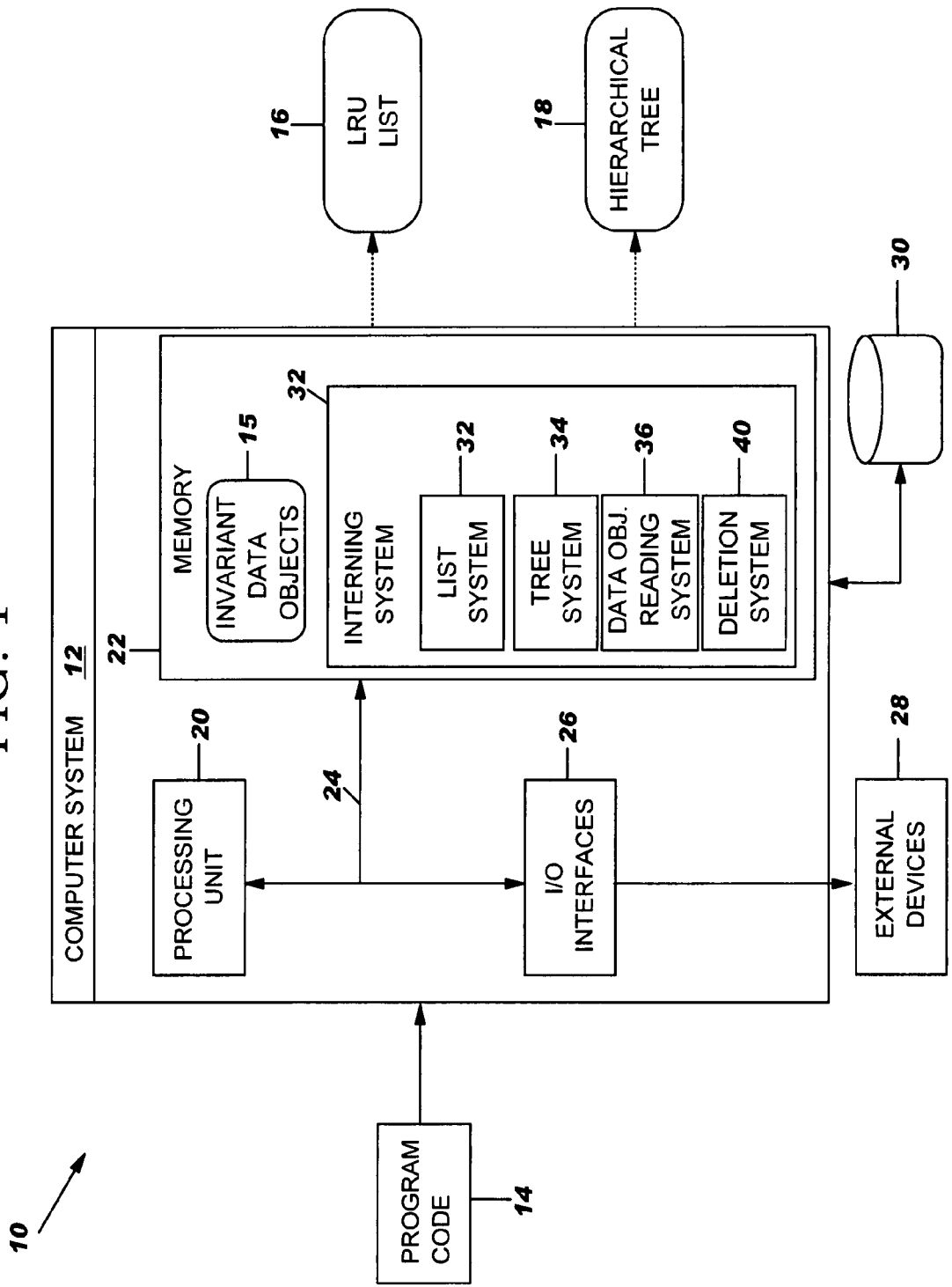
FIG. 1 depicts an illustrative system for interning invariant data objects according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

As indicated above, the present invention provides a method, system and program product for interning invariant data objects in dynamic space constrained systems. Specifically, under the present invention, a Least Recently Used (LRU) list and corresponding hierarchical tree are provided. The LRU list and tree each include a predetermined quantity of nodes that are associated with invariant data objects. The nodes typically include one set of pointers that indicate a position/arrangement of the associated invariant data objects in the LRU list, and another set of pointers that indicate a logical relationship among the other nodes of the hierarchical tree. When an invariant data object is loaded at runtime, the tree is checked to see if an identical invariant data object is present. If it is, the node in the LRU list associated with the invariant data object is moved to the head of the LRU list. However, if the invariant data object is not present in the tree, a new node associated therewith is added to the LRU list and the tree. This new node is typically placed at the head of the LRU list. As nodes of the LRU list are repositioned or added, the pointers of the corresponding nodes of the hierarchical tree will be rearranged accordingly.

Referring now to FIG. 1, an illustrative system 10 for interning invariant data objects in dynamic space constrained systems according to the present invention is shown. Specifically, system 10 includes a computer system 12 that reads program code 14, and utilizes a Least Recently Used (LRU) list 16 and a corresponding hierarchical tree 18 to intern invariant data objects 15 found in the program code 14 at runtime (e.g., a dynamic system). It should be understood that computer system 12 could be part of a larger computer infrastructure or environment. In addition, computer system 12 should be understood to be any type of computerized device capable of carrying out the teachings of the present invention. For example, computer system 12 can be a desktop computer, a laptop computer, a hand held device, a client, a server, etc.

The teachings of the present invention can be implemented via a stand-alone system as shown, or over a network such as the Internet, a local area network (LAN), a wide area network (WAN), a virtual private network (VPN), etc. In the case of the latter, communication throughout the network could occur via a direct hardwired connection (e.g., serial port), or via an addressable connection that may utilize any combination of wireline and/or wireless transmission methods. Conventional network connectivity, such as Token Ring, Ethernet, WiFi or other conventional communications standards could be used. Still yet, connectivity could be provided by conventional IP-based protocol. In this instance, an Internet service provider could be used to establish interconnectivity.

As further shown, computer system 12 generally includes processing unit 20, memory 22, bus 24, input/output (I/O) interfaces 26, external devices/resources 28 and storage unit 30. Processing unit 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, a data object, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LCD screen, hand-held device, keyboard, mouse, voice recognition system, speech output system, printer, monitor/display, facsimile, pager, etc. Bus 24 provides a communication link between each of the components in computer system 12 and likewise may comprise any known type of transmission link, including electrical, optical, wireless, etc.

Storage unit 30 can be any system (e.g., a database, etc.) capable of providing storage for information under the present invention. Such information could include, among other things, LRU list 16, hierarchical tree 18, etc. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Although not shown, additional components, such as cache memory, communication systems, system software, etc., may be incorporated into computer system 12.

Shown in memory 22 of computer system 12 as a program product is interning system 32, which includes list system 34, tree system 36, data object reading system 38 and deletion system 40. It should be understood that the present invention interns invariant data objects at runtime. Accordingly, interning system 32 will likely work in conjunction with, or be incorporated within, other components not shown in FIG. 1. Such components can include, for example, a compiler (e.g., a Java Just-in-Time compiler), a process/virtual machine (e.g., a Java Virtual Machine), etc.

As mentioned above, as invariant data objects found in the program code 14 are read into invariant data object memory 22 for the first time, nodes associated therewith are added to the LRU list 16 and the hierarchical tree 18. The nodes are positioned/ordered within LRU list 16 based on the recentness of use/reading of the associated invariant data objects. Specifically, the most recently read invariant data object is placed at the head of the LRU list 16, while the least recently used becomes the tail. For example, assume that some period of time after initially being read, the node for invariant data object "A" is positioned third in LRU list 16. Further assume that invariant data object "A" is then re-read. At that point, its associated node will be moved to first in the LRU list 16.

As will be further discussed below, each node of LRU list 16 and hierarchical tree 18 includes a first set of pointers that indicate its position within the LRU list 16, and a second set of pointers that indicate the logical relationships among the nodes in hierarchical tree 16. As such, the structure of hierarchical tree 18 need never change when the nodes are re-positioned within LRU list 16. Specifically, when nodes are repositioned within the LRU list as their associated invariant data objects are read, the first set of pointers will be rearranged to reflect the repositioning in the LRU list, but the second set of pointers remains unchanged. Moreover, in order to prevent the size of LRU list 16 and hierarchical tree 18 from exceeding any benefits gained by the implementation thereof, a fixed maximum quantity of nodes can be designated. If this quantity is about to be exceeded by the addition of a new node, then the node at the tail of LRU list 16 can be deleted from LRU list 16 and hierarchical tree 18. As indicated above, the tail of LRU list 16 represents the least recently used invariant data object (i.e., the invariant data object read the longest period of time ago). Should the invariant data object for the deleted node be re-read, a new node can be added to LRU list 16 and hierarchical tree 18, as if it were never read before. When a node is removed from LRU list 16 and hierarchical tree 18 only the node is deleted. In particular, the invariant data associated with the node is not deleted.

Figure 2:
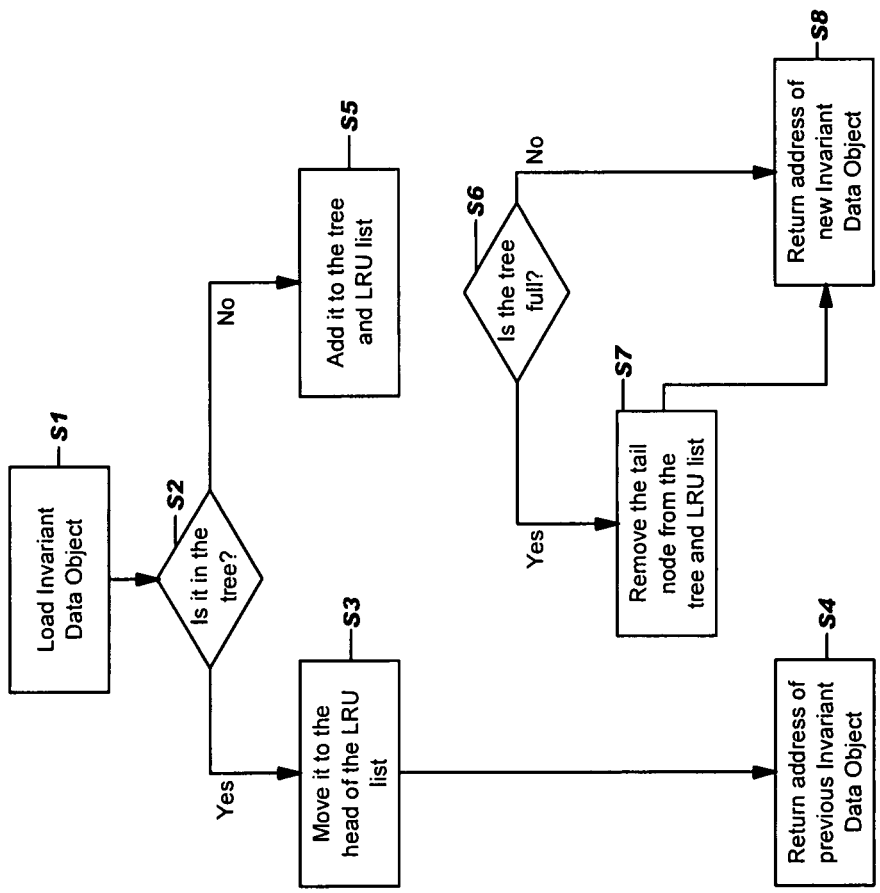
FIG. 2 depicts a method flow diagram according to the present invention.

These concepts will be more specifically shown and described below in conjunction with FIGS. 3-6. However, referring briefly to FIG. 2, these concepts will be first described in conjunction with method flow diagram 50. In first step S1, an invariant data object is loaded/read into memory 22 by data object reading system 38 of FIG. 1. In step S2, it is determined whether that invariant data object is identical to an invariant data object associated with a node already in the hierarchical tree (e.g., as determined by data object reading system 38). If so, the node associated with the invariant data object is moved to the head of the LRU list in step S3, and the address of the previous invariant data object within memory 22 is returned in step S4. However, if in step S2, the invariant data object was not already represented in the hierarchical tree, then it is being loaded/read for the first time, or has previously expired from the hierarchical tree and LRU list. Thus, in step S5, a node is allocated and associated with the invariant data object and added to the LRU list and hierarchical tree. In step S6, it is determined whether the hierarchical tree is full. That, is it is determined whether the hierarchical tree now includes a quantity of nodes greater than the predetermined maximum quantity. If so, the node which is the tail of the LRU list is removed from the LRU list and hierarchical tree in step S7 before the address of the new invariant data object is returned in step S8. If the tree is not yet full in step S6, the address of the new invariant data object can be returned in step S8 without any deletion occurring.

Referring back to FIG. 1, the workings of the present invention will be shown and described in greater detail. As program code 14 is being loaded, data object reading system 38 will analyze program code 14 for invariant data objects 15, shown in memory 22. As this is occurring, list system 34 and tree system 36 will maintain LRU list 16 and hierarchical tree 18, respectively. As indicated above, this could involve adding and/or repositioning nodes and pointers accordingly. It should be appreciated that tree system 34 and list system 36 could be embodied as a single "logical structure" system. They are shown as separate systems for illustrative purposes only. Moreover, deletion system 40 can be used to designate a predetermined quantity (e.g., a maximum) of nodes for LRU list 16 and hierarchical tree 18. If this quantity is exceeded or is about to be exceeded by the addition of a new node, deletion system 40 can automatically delete the tail node from hierarchical tree 18 and LRU list 16.

Figure 3:
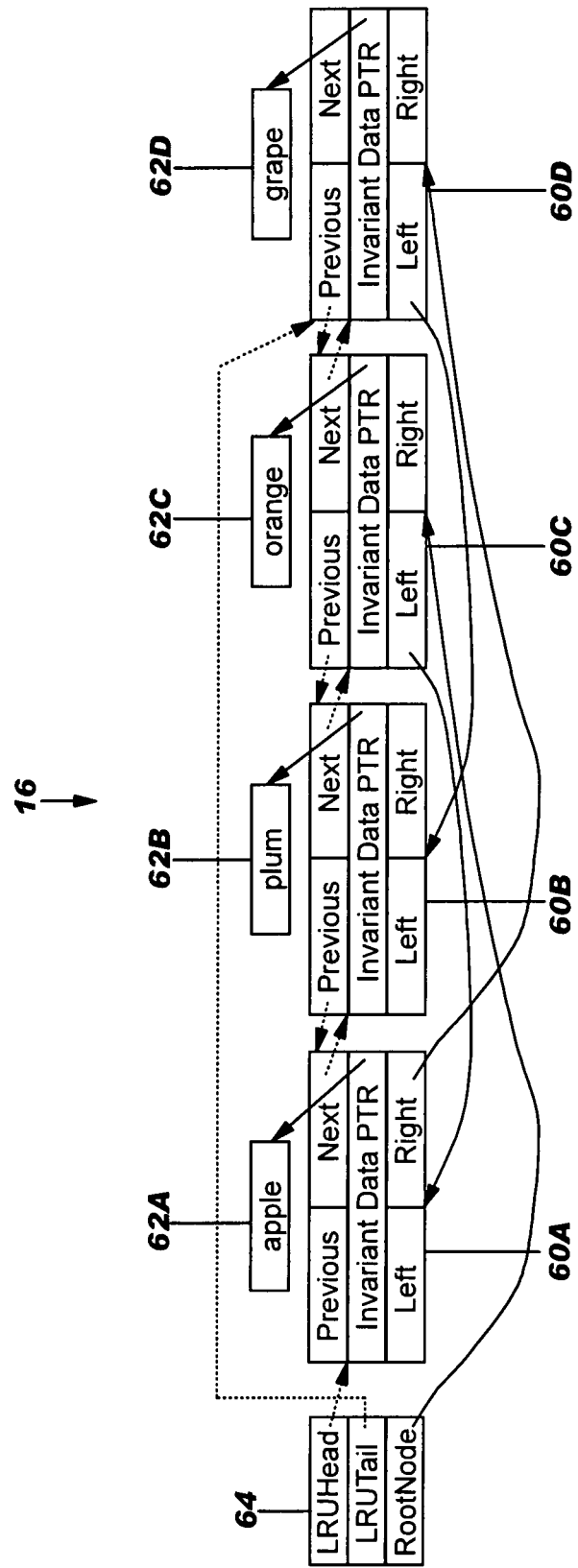
FIG. 3 depicts an illustrative LRU list in a first state according to the present invention.

Referring to FIG. 3, an illustrative LRU list 16 as created and maintained by list system 34 (FIG. 1) is shown. As depicted, LRU list 16 includes nodes 60A-D. Each node 60A-D is associated with an invariant data object 62A-D ("apple," "plum," "orange," and "grape"). This assumes that data object reading system 38 (FIG. 1) has read the invariant data objects "apple," "plum," "orange," and "grape" while loading and/or compiling program code 14. Moreover, each node 60A-D is positioned/ordered within LRU list 16 based on its recentness in being read by data object reading system 38 (FIG. 1). Accordingly, "apple" was read most recently, while "grape" was read least recently during the loading of program code 14. Structure header 64 includes pointers to indicate the head (node 60A) and tail (node 60D) of LRU list 16, as well as a pointer to indicate the root (60C) of the corresponding hierarchical tree (e.g., FIG. 4). Nodes 60A-D themselves also include multiple sets of pointers. A first set of pointers (shown in dashed lines) are "previous" and "next" pointers. A second set of pointers (shown in solid lines) along with the pointers to invariant data objects 62A-D) are "left" and "right" pointers. These sets of pointers will be more specifically described below in conjunction with the hierarchical trees of FIGS. 4 and 6. However, in general, the "previous" and "next" pointers are used to indicate the order in which the nodes appear within LRU list 16, while the "left" and right" pointers are used to indicate a logical relationship among the nodes of the corresponding hierarchical tree.

Figure 4:
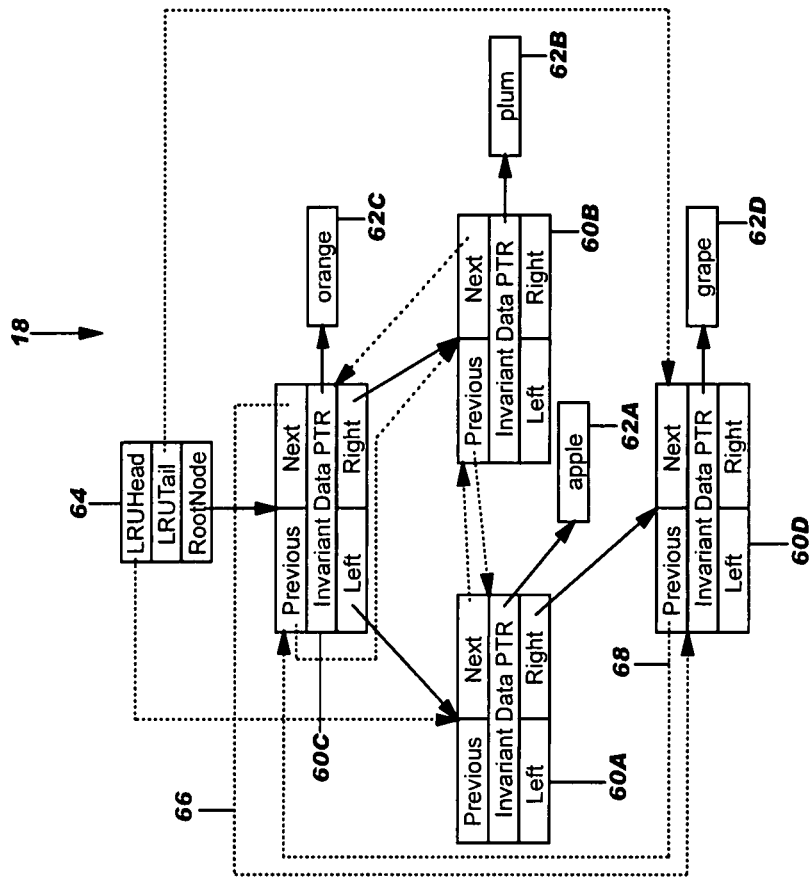
FIG. 4 depicts an illustrative hierarchical tree corresponding to the LRU list of FIG. 3.

Referring now to FIG. 4, an illustrative hierarchical tree 18 (hereinafter tree 18) corresponding to LRU list 16 of FIG. 3 is shown (e.g., as generated by tree system 36 of FIG. 1). It should be understood in advance that although hierarchical tree 18 is shown as an AVL tree, other types of trees (e.g., Btrees) could be implemented hereunder. In general, because hierarchical tree 18 corresponds to LRU list 16, it contains the same nodes/structure 60A-D (only now rendered as a hierarchical tree). As mentioned above, nodes 60A-D include certain sets of pointers. These will now be explained in greater detail. First, nodes 60A-D each include a "previous" pointer and a "next" pointer. These pointers indicate an order of the nodes within LRU list 16. Specifically, starting at the head of tree 18 as indicated by structure header 64 (i.e., node 60A), the "next" pointers point to a subsequent node in the LRU list, while the "previous" pointers point to a previous node in the LRU list. Following this pattern, nodes 60A-D are ordered as follows: first node 60A, then node 60B, then node 60C and finally node 60D. In providing these pointers, it can be seen that the "next" pointer of one node points to a node whose "previous" pointer points to the former node, and vice versa. For example, node 60C has a "next" pointer 66 pointing to node 60D, and node 60D has a "previous" pointer 68 pointing to node 60C. Nodes 60A-D also include "left" and "right" pointers to indicate a logical relationship among the nodes 60A-D. Specifically, under the present invention, each node is "aware" of its logical relationship to other nodes. For example, node 60C has a left pointer 70 pointing to node 60A and a right pointer 72 pointing to node 60B. This indicates that node 60A is logically sorted before node 60C, while node 60B is logically sorted after node 60C.

Figure 5:
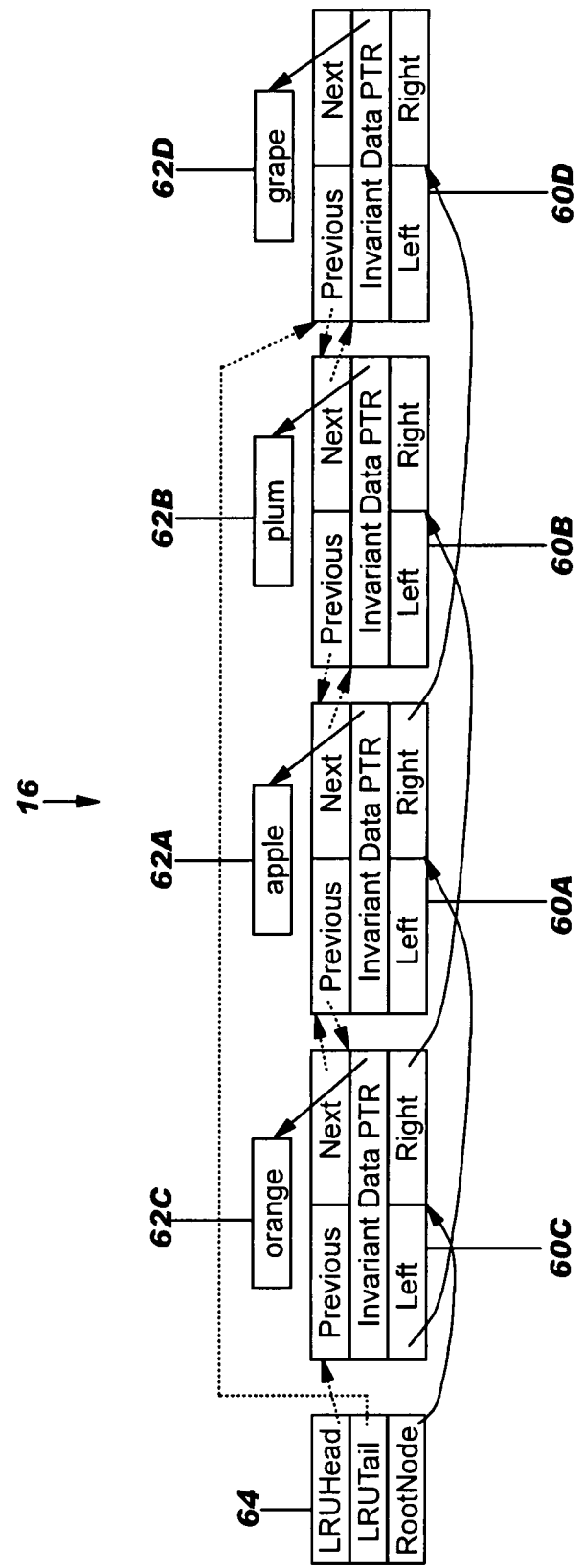
FIG. 5 depicts an illustrative LRU list in a second state according to the present invention.

Assume now that after reading invariant data objects 62A-D, invariant data object 62C (orange) is re-read during the loading/compiling of program code 14. The re-reading/re-loading of an invariant data object can be detected by an analysis of the hierarchical tree 18 by interning system 32 (e.g., by data object reading system 38). List system 34 (FIG. 1) will reposition/order nodes 60A-D. Referring now to FIG. 5, LRU list 16 after the repositioning is shown. As depicted, node 60C associated with invariant data object 62C (orange) as been placed at the head of LRU list [16], while the nodes 60A and 60B have been shifted down one position. After this repositioning is complete, node 60D will remain the tail of LRU list 16.

Figure 6:
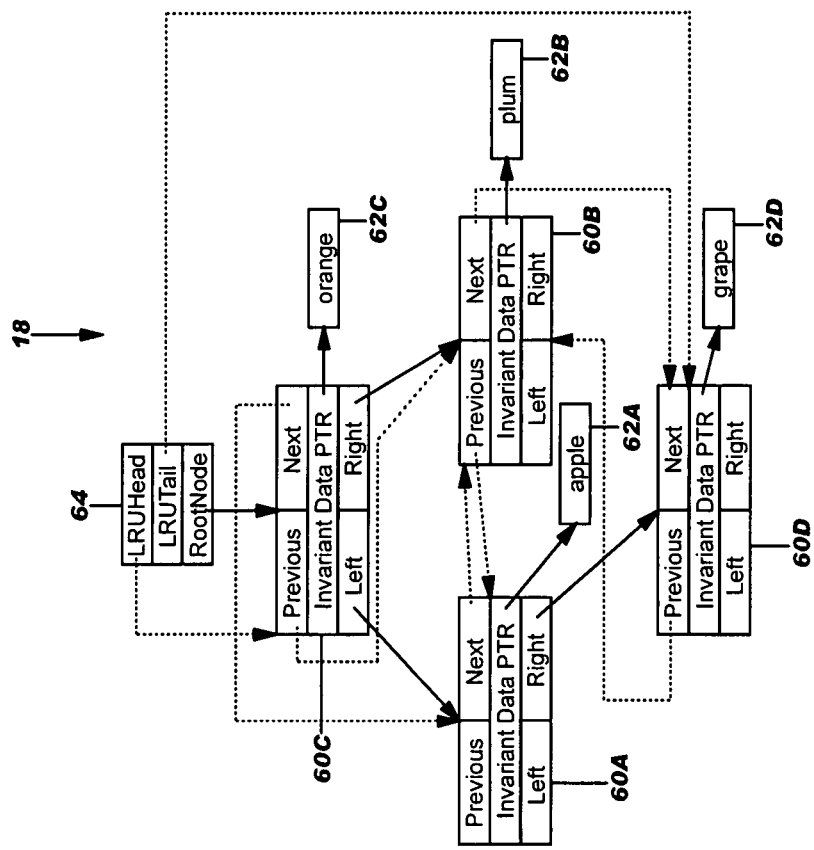
FIG. 6 depicts an illustrative hierarchical tree corresponding to the LRU list of FIG. 5.

FIG. 6 illustrates the hierarchical tree 18 corresponding of LRU list 16 of FIG. 5. Specifically, tree 18 of FIG. 6 is shown after the "previous" and "next" pointers have been rearranged (e.g., by tree system 36) to account for the repositioning of list nodes 60A-D in LRU list 16 shown in FIG. 5. As can be seen, the "head" pointer from structure header 64 now points to node 60C, while the "tail" pointer still points to node 60D and the "root" pointer to node 60C. Following the "next" pointers from node 60C, the order is confirmed as first node 60C, then node 60A, then node 60B, and finally node 60D.

Thus, the physical structure of tree 16 was not required to be changed when an invariant data object is re-read. Moreover, the logical relationships between nodes 60A-D within the hierarchical tree 18 (e.g., as indicated by the "left" and "right" pointers did not change due to the repositioning of node 60C within the LRU list 16.

Assume now that a new or previously expired invariant data object is read. As mentioned above, since it is new, a node will not exist for it in tree 18 or LRU list 16. Thus, a new node must be added. Since the new invariant data object would represent the most recently read, its associated node would be added at the head of LRU list 16. This would cause a shift downward in order for the other nodes 60A-D, with node 60D still being the tail. Thus, if the new node was added to FIG. 3, the order would be: the new node, then node 60A, then node 60B, then node 60C and finally node 60D. If the new node was added to FIG. 5, the order would be: the new node, then node 60C, then node 60A, then node 60B and finally node 60D. As the new head of the LRU list, the "head" pointer of the structure header 64 would be modified to point to the new node, and the "next" pointer of the new node would point to the previous head node. Similarly, the new node would also be added to tree 18 at a position dependent on its logical relationship with the existing nodes in the tree. When the number of nodes in LRU list 16 and tree 18 exceeds the predetermined quantity, deletion system 40 (FIG. 1) can delete nodes therefrom. In a typical embodiment, deletion occurs from the tail of LRU list 16. For example, referring to FIGS. 5 and 6, if a new node was added, and the addition caused the predetermined size to be exceeded, then node 60D could be removed from LRU list 16 and tree 18.

It should be appreciated that under the present invention, since invariant data objects can be removed from memory, care is taken so that nodes 60A-D will always refer to valid invariant data, and so that shared references will always be able to use it for the lifetime of the invariant data object. Anything invariant data objects 15 in memory 22 that is being unloaded will be removed from LRU list 16 and hierarchical tree 18. Since, some components require other components to be loaded, they can be marked as sharable to specific components (e.g., any class in the same class loader). That is, anything in the load dependencies of a component may be shared with that component. As a result, LRU list 16 and hierarchical tree 18 may end up with multiple nodes corresponding to copies of identical invariant data objects. Each copy will be sharable in different segments of memory or different components. Using a different search routine than insertion routine allows this to be taken advantage of (e.g., the insertion routine should process everything as being unsharable). This prevents sharing invariant data objects that will be unloaded before they will be needed. Detecting if the node in the hierarchical tree 18 is sharable, can be done in a variety of ways (e.g., simply looking at memory segment of the invariant data object, or storing meta data in the nodes).

It should be appreciated that the present invention could be offered as a business method on a subscription or fee basis. For example, computer system 12 and/or interning system 32 of FIG. 1 could be created, supported, maintained and/or deployed by a service provider that offers the functions described herein for customers. That is, a service provider could offer to identify web page dependencies for web users or clients.

It should also be understood that the present invention can be realized in hardware, software, a propagated signal, or any combination thereof. Any kind of computer/server system (s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, it should be understood that although a certain type of hierarchical tree was depicted herein, the teachings of the present invention could be implemented with other types of hierarchical trees (e.g., BTrees).

We claim:

1. A method for interning invariant data objects in a computer implemented system, comprising:
   providing a list of least recently used invariant data objects, wherein the list includes a predetermined quantity of nodes that are associated with invariant data objects, wherein the nodes are positioned in the list based on a recentness of use of their associated invariant data objects, and wherein each of the nodes includes a first set of pointers that point to other nodes based on the positioning of the nodes in the list;
   providing a hierarchical tree corresponding to the list, wherein hierarchical tree includes all of the nodes in the list;
   reading an invariant data object;
   placing a node associated with the invariant data object at the head of the list; and
   rearranging the first set of pointers of the nodes of the hierarchical tree based on the placing.

2. The method of claim 1, wherein the nodes further comprise a second set of pointers for indicating logical relationships among the nodes.

3. The method of claim 1, wherein the nodes each correspond to a single invariant data object.

4. The method of claim 1, wherein the placing step comprises:
   adding a new node to the list and to the hierarchical tree if the invariant data object was not previously found in the hierarchical tree; and
   placing the new node at the head of the list.

5. The method of claim 1, wherein a tail of the list is occupied by a node associated with a least recently used invariant data object.

6. A method for interning invariant data objects in a computer implemented system, comprising:
   providing a list of least recently used invariant data objects, wherein the list includes a predetermined quantity of nodes that are associated with invariant data objects, wherein the nodes are positioned in the list based on a recentness of use of their associated invariant data objects, and wherein each of the nodes includes a first set of pointers that point to other nodes based on the positioning of the nodes in the list;
   providing a hierarchical tree corresponding to the list, wherein hierarchical tree includes all of the nodes in the list;
   reading an invariant data object;
   placing a node associated with the invariant data object at the head of the list;
   rearranging the first set of pointers of the nodes of the hierarchical tree based on the placing; and
   deleting the node at the tail of the list from both the list and the hierarchical tree to prevent the predetermined quantity from being exceeded;
   wherein a tail of the list is occupied by a node associated with a least recently used invariant data object.

7. The method of claim 1, wherein the reading, placing and rearranging steps are carried out at runtime of a program.

8. A computer program product embodied in a tangible, non-transient computer readable storage medium for interning invariant data objects in dynamic space constrained systems, the computer program product comprising the programming instructions for:
   providing a list of least recently used invariant data objects, wherein the list includes a predetermined quantity of nodes that are associated with invariant data objects, wherein the nodes are positioned in the list based on a recentness of use of their associated invariant data objects, and wherein each of the nodes includes a first set of pointers that point to other nodes based on the positioning of the nodes in the list;
   providing a hierarchical tree corresponding to the list, wherein hierarchical tree includes all of the nodes in the list; and
   reading an invariant data object, wherein a node associated with the invariant data object is placed at the head of the list, and wherein the first set of pointers of the nodes of the hierarchical tree are rearranged based on the placing.

9. The computer program product of claim 8, wherein the nodes further comprise a left pointer and a right pointer for indicating logical relationships among the nodes.

10. The computer program product of claim 8, wherein the nodes each correspond to a single invariant data object.

11. The computer program product of claim 8, further comprising the programming instructions for:
   adding a new node to the list and to the hierarchical tree if the invariant data object was not found in the hierarchical tree, and for placing the new node at the head of the list.

12. The computer program product claim 8, wherein a tail of the list is occupied by a node associated with a least recently used invariant data object.

13. A computer program product embodied in a tangible, non-transient computer readable storage medium for interning invariant data objects in dynamic space constrained systems, the computer program product comprising the programming instructions for:
   providing a list of least recently used invariant data objects, wherein the list includes a predetermined quantity of nodes that are associated with invariant data objects, wherein the nodes are positioned in the list based on a recentness of use of their associated invariant data objects, and wherein each of the nodes includes a first set of pointers that point to other nodes based on the positioning of the nodes in the list;
   providing a hierarchical tree corresponding to the list, wherein hierarchical tree includes all of the nodes in the list;
   reading an invariant data object, wherein a node associated with the invariant data object is placed at the head of the list, and wherein the first set of pointers of the nodes of the hierarchical tree are rearranged based on the placing; and
   deleting the node at the tail of the list from the list and hierarchical tree to prevent the predetermined quantity from being exceeded;

wherein a tail of the list is occupied by a node associated with a least recently used invariant data object.

14. A method for deploying an application for interning invariant data objects in dynamic space constrained systems, comprising:
providing a computer infrastructure being operable to:
provide a list of least recently used invariant data objects, wherein the list includes a predetermined quantity of nodes that are associated with invariant data objects, wherein the nodes are positioned in the list based on a recentness of use of their associated invariant data objects, and wherein each of the nodes includes a first set of pointers that point to other nodes based on the positioning of the nodes in the list;
provide a hierarchical tree corresponding to the list, wherein hierarchical tree includes all of the nodes in the list;
read an invariant data object;
place a node associated with the invariant data object at the head of the list; and
rearrange the first set of pointers of the nodes of the hierarchical tree based on the placing.

15. A system, comprising:
a memory unit for storing a computer program for interning invariant data objects in dynamic space constrained systems; and
a processor coupled to said memory unit, wherein said processor, responsive to said computer program, comprises:
circuitry for providing a list of least recently used invariant data objects, wherein the list includes a predetermined quantity of nodes that are associated with invariant data objects, wherein the nodes are positioned in the list based on a recentness of use of their associated invariant data objects, and wherein each of the nodes includes a first set of pointers that point to other nodes based on the positioning of the nodes in the list;
circuitry for providing a hierarchical tree corresponding to the list, wherein hierarchical tree includes all of the nodes in the list;
circuitry for reading an invariant data object;
circuitry for placing a node associated with the invariant data object at the head of the list; and
circuitry for rearranging the first set of pointers of the nodes of the hierarchical tree based on the placing.

16. The system as recited in claim 15, wherein the nodes further comprise a second set of pointers for indicating logical relationships among the nodes.

17. The system as recited in claim 15, wherein the nodes each correspond to a single invariant data object.

18. The system as recited in claim 15, wherein the circuitry for placing the node associated with the invariant data object at the head of the list comprises:
circuitry for adding a new node to the list and to the hierarchical tree if the invariant data object was not previously found in the hierarchical tree; and
circuitry for placing the new node at the head of the list.

19. The system as recited in claim 15, wherein a tail of the list is occupied by a node associated with a least recently used invariant data object.

20. A system, comprising:
a memory unit for storing a computer program for interning invariant data objects in dynamic space constrained systems; and
a processor coupled to said memory unit, wherein said processor, responsive to said computer program, comprises:
circuitry for providing a list of least recently used invariant data objects, wherein the list includes a predetermined quantity of nodes that are associated with invariant data objects, wherein the nodes are positioned in the list based on a recentness of use of their associated invariant data objects, and wherein each of the nodes includes a first set of pointers that point to other nodes based on the positioning of the nodes in the list;
circuitry for providing a hierarchical tree corresponding to the list, wherein hierarchical tree includes all of the nodes in the list;
circuitry for reading an invariant data object;
circuitry for placing a node associated with the invariant data object at the head of the list;
circuitry for rearranging the first set of pointers of the nodes of the hierarchical tree based on the placing; and
circuitry for deleting the node at the tail of the list from both the list and the hierarchical tree to prevent the predetermined quantity from being exceeded;
wherein a tail of the list is occupied by a node associated with a least recently used invariant data object.

* * * * *